(12) United States Patent
Shinohara

(10) Patent No.: US 10,782,155 B2
(45) Date of Patent: Sep. 22, 2020

(54) ANGLE DETECTION APPARATUS AND INTEGRATED CIRCUIT

(71) Applicant: Kabushiki Kaisha Toshiba, Minato-ku, Tokyo (JP)

(72) Inventor: Makoto Shinohara, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 480 days.

(21) Appl. No.: 15/443,637

(22) Filed: Feb. 27, 2017

(65) Prior Publication Data

US 2018/0073896 A1    Mar. 15, 2018

Related U.S. Application Data

(60) Provisional application No. 62/385,404, filed on Sep. 9, 2016.

(51) Int. Cl.
*G01D 5/14* (2006.01)
*G01D 5/20* (2006.01)

(52) U.S. Cl.
CPC .................................... *G01D 5/204* (2013.01)

(58) Field of Classification Search
CPC ........................................................ G01D 5/204
See application file for complete search history.

(56) References Cited

U.S. PATENT DOCUMENTS

| | | | | |
|---|---|---|---|---|
| 4,575,835 A | * | 3/1986 | Nishikawa | G11B 19/24 369/240 |
| 6,389,373 B1 | * | 5/2002 | Ohya | H03M 1/485 347/116 |
| 2001/0054911 A1 | * | 12/2001 | Kobayashi | G01R 31/346 324/765.01 |
| 2009/0230901 A1 | * | 9/2009 | Amano | B60L 50/16 318/400.3 |
| 2013/0060518 A1 | * | 3/2013 | Nakazato | G01D 5/2073 702/151 |

(Continued)

FOREIGN PATENT DOCUMENTS

| JP | 2014-057395 A | | 3/2014 |
|---|---|---|---|
| JP | 2015-104159 A | | 6/2015 |
| JP | 2015104159 A | * | 6/2015 |

*Primary Examiner* — Mohamed Charioui
*Assistant Examiner* — Eyob Hagos
(74) *Attorney, Agent, or Firm* — White & Case LLP

(57) ABSTRACT

An angle detection apparatus includes a first integrated circuit and a second integrated circuit. The first integrated circuit generates and outputs an excitation signal to a first resolver for detecting a rotation angle of a first rotating apparatus, generates a first detection sync signal for performing synchronous detection synchronized with the excitation signal for an output signal of the first resolver, and performs the synchronous detection based on the first detection sync signal to output a first angle signal of the first rotating apparatus. The second integrated circuit receives the excitation signal, generates a second detection sync signal for performing the synchronous detection synchronized with the received excitation signal, for an output signal from a second resolver for detecting a rotation angle of a second rotating apparatus, and performs the synchronous detection based on the second detection sync signal to output a second angle signal of the second rotating apparatus.

8 Claims, 5 Drawing Sheets

(56) References Cited

U.S. PATENT DOCUMENTS

| | | | |
|---|---|---|---|
| 2013/0249452 A1* | 9/2013 | Shinohara | G01D 5/2073 318/400.04 |
| 2014/0167663 A1* | 6/2014 | Ide | H02P 21/18 318/400.09 |
| 2014/0285125 A1* | 9/2014 | Kato | H02P 21/141 318/400.02 |
| 2014/0292239 A1* | 10/2014 | Kato | H02P 21/22 318/400.02 |
| 2014/0346983 A1* | 11/2014 | Kato | H02P 21/0089 318/400.02 |
| 2015/0171776 A1* | 6/2015 | Ota | B60L 9/22 318/8 |
| 2016/0301336 A1* | 10/2016 | Nishibata | H02P 6/16 |
| 2018/0154926 A1* | 6/2018 | Ohira | B62D 5/04 |

* cited by examiner

ANGLE DETECTION APPARATUS AND INTEGRATED CIRCUIT

CROSS-REFERENCE TO RELATED APPLICATIONS

This application is based upon and claims the benefit of priority from U.S. Provisional Application No. 62/385,404, filed on Sep. 9, 2016, the entire contents of which are incorporated herein by reference.

FIELD

An embodiment described herein relates generally to an angle detection apparatus for detecting a rotation angle of a rotating apparatus from an output signal of a resolver attached to the rotating apparatus, and an integrated circuit.

BACKGROUND

Angle detection apparatuses for detecting a rotation angle of a rotating apparatus such as a motor and a generator from an output signal of a resolver are widely used. The angle detection apparatus supplies an excitation signal to the resolver, calculates a rotation angle of a rotating apparatus by performing synchronous detection for an output signal from the resolver and outputs information about the calculated rotation angle.

An excitation signal generation portion and a resolver digital converter portion of the angle detection apparatus is configured with an integrated circuit including a microprocessor. Further, each of an excitation interface circuit configured to supply an excitation signal to the resolver and a resolver interface circuit configured to receive an output signal from the resolver is configured with a circuit such as a discrete transistor and an operational amplifier. The integrated circuit and the interface circuits are mounted on a printed circuit board.

In a case of detecting a rotation angle of each rotating apparatus in a system including a plurality of rotating apparatuses, it is necessary to provide the angle detection apparatus for each resolver.

In that case, it is conceivable to cause the excitation interface circuit to be shared by a plurality of integrated circuits for a purpose of cost reduction.

However, since mutually different crystal resonators are used for the plurality of angle detection apparatuses, difference exists among oscillation frequencies of the plurality of crystal resonators. In general, an oscillation frequency of an oscillator using a crystal resonator has an error of several hundreds of ppm's due to individual difference of the crystal resonator.

Therefore, in the case where the excitation interface circuit is caused to be shared, there is an error between an excitation cycle of a resolver generated by a certain integrated circuit and cycles of internal clocks for synchronous detection of the other integrated circuits, and, therefore, the angle detection apparatuses of the other integrated circuits cannot perform synchronous detection.

DETAILED DESCRIPTION

An angle detection apparatus of embodiments includes: a first integrated circuit configured to generate and output an excitation signal to a first resolver for detecting a rotation angle of a first rotating apparatus, generate a first detection sync signal for performing synchronous detection synchronized with the excitation signal for an output signal of the first resolver, and perform the synchronous detection based on the first detection sync signal to output a first angle signal of the first rotating apparatus; and a second integrated circuit configured to receive the excitation signal, generate a second detection sync signal for performing the synchronous detection synchronized with the received excitation signal, for an output signal from a second resolver for detecting a rotation angle of a second rotating apparatus, and perform the synchronous detection based on the second detection sync signal to output a second angle signal of the second rotating apparatus.

A plurality of embodiments will be described below.

First Embodiment

Figure 1:
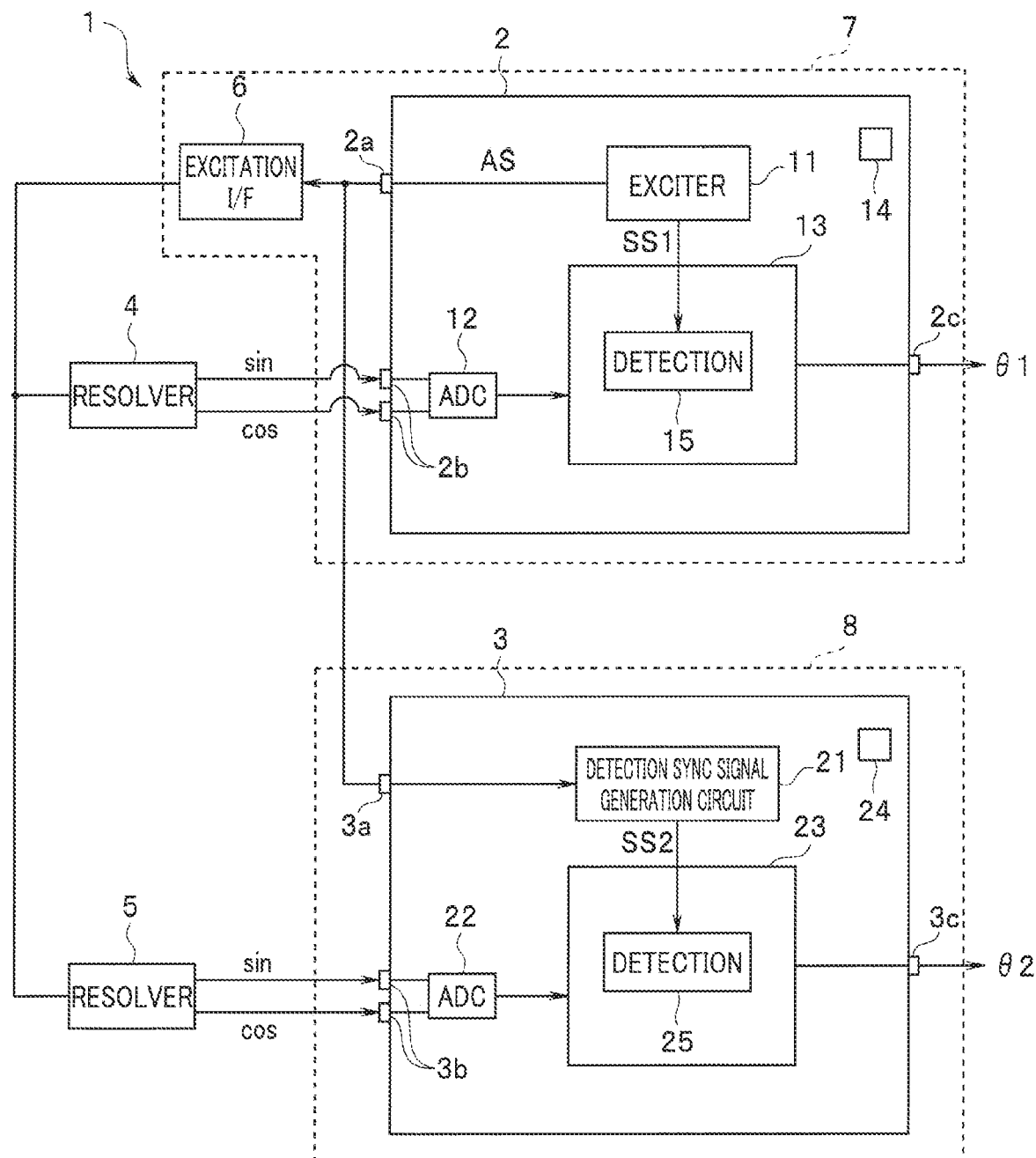
FIG. 1 is a block diagram of an angle detection apparatus for detecting rotation angles of two rotating apparatuses according to a first embodiment.

FIG. 1 is a block diagram of an angle detection apparatus for detecting rotation angles of two rotating apparatuses.

An angle detection apparatus 1 includes two integrated circuits 2 and 3 each of which has an angle detection portion, and an excitation interface circuit (hereinafter abbreviated as an excitation I/F) 6 configured to supply an excitation signal to resolvers 4 and 5. The angle detection apparatus 1 is used, for example, to detect the rotation angles of the two rotating apparatuses, a generator and a motor of a hybrid vehicle.

The integrated circuit 2 is a semiconductor device including an excitation signal generation portion 11 including an exciter, an analog/digital conversion portion (hereinafter abbreviated as an ADC) 12, an angle detection portion 13 and a crystal oscillator 14. The angle detection portion 13 includes a detection circuit 15 configured to perform synchronous detection.

The excitation signal generation portion 11 generates an excitation signal AS and outputs the excitation signal AS to the excitation I/F 6. The excitation I/F 6 amplifies the excitation signal AS and outputs the excitation signal AS to the resolvers 4 and 5. A configuration of the excitation signal generation portion 11 will be described later.

The integrated circuit 2 and the excitation I/F 6 are mounted on a printed circuit board 7 indicated by a dotted line.

The resolver 4 is attached to a rotation axis of a first rotating apparatus such as a generator. The resolver 4 has an excitation coil, and two detection coils orthogonal to each other. Depending on a rotation angle of the first rotating apparatus, the resolver 4 outputs a sin phase signal and a cos phase signal generated by the two detection coils as output signals obtained by amplitude-modulating the excitation signal AS inputted to the excitation coil. The sin phase signal and the cos phase signal of the resolver 4 are outputted to the ADC 12.

The ADC 12 includes a ΔΣ converter. The ADC 12 converts the output signals from the resolver 4 to digital signals via a resolver interface circuit (not shown).

The detection circuit 15 performs synchronous detection synchronized with the excitation signal AS.

The angle detection portion 13 further includes a multiplier, a PI controller, an integrator filter and the like not shown. The ADC 12 and the angle detection portion 13 constitute a resolver digital converter. The resolver digital converter includes a central processing unit (hereinafter referred to as a CPU) such as a microprocessor, and part of functions of the angle detection portion 13 are realized by execution of a program by the CPU.

The angle detection portion 13 samples an output signal from the resolver 4 and performs synchronous detection by the detection circuit 15. Then, the angle detection portion 13 performs integration and the like of an output signal of the detection circuit 15 and outputs an angle signal θ1, which is a digital signal showing the rotation angle of the first rotating apparatus.

The crystal oscillator 14 has a crystal resonator and is used to generate a reference clock signal to be a reference of an operation of each circuit in the integrated circuit 2 and various internal clock signals.

The integrated circuit 2 has an output terminal 2a for the excitation signal AS, an input terminal 2b for receiving the output signals from the resolver 4 and an output terminal 2c for the angle signal θ1.

The integrated circuit 3 is a semiconductor device including a detection sync signal generation circuit 21, an ADC 22, an angle detection portion 23 and a crystal oscillator 24. The angle detection portion 23 includes a detection circuit 25 configured to perform synchronous detection.

The integrated circuit 3 is mounted on a printed circuit board 8 indicated by a dotted line.

The integrated circuit 3 has a detection sync signal generation circuit 21 configured to receive the excitation signal AS from the integrated circuit 2 and generates a detection sync signal SS2. A configuration of the detection sync signal generation circuit 21 will be described later.

The resolver 5 is attached to a rotation axis of a second rotating apparatus such as a motor, which is different from the first rotating apparatus.

The resolver 5 has an excitation coil, and two detection coils orthogonal to each other. Depending on a rotation angle of the second rotating apparatus, the resolver 5 outputs a sin phase signal and a cos phase signal generated by the two detection coils as output signals obtained by amplitude-modulating the inputted excitation signal AS. The sin phase signal and the cos phase signal of the resolver 5 are outputted to the ADC 22.

The ADC 22 includes a ΔΣ converter. The ADC 22 converts the output signals from the resolver 5 to digital signals via a resolver interface circuit (not shown).

The detection circuit 25 performs synchronous detection synchronized with the excitation signal AS.

The angle detection portion 23 further includes a multiplier, a PI controller, an integrator filter and the like not shown. The ADC 22 and the angle detection portion 23 constitute a resolver digital converter. The resolver digital converter of the integrated circuit 3 also includes a CPU such as a microprocessor, and part of functions of the angle detection portion 23 are realized by execution of a program by the CPU.

The angle detection portion 23 samples an output signal from the resolver 5 and performs synchronous detection by the detection circuit 15. Then, the angle detection portion 23 performs integration and the like of an output signal of the detection circuit 25 and outputs an angle signal θ2, which is a digital signal indicating the rotation angle of the second rotating apparatus.

The crystal oscillator 24 has a crystal resonator and is used to generate a reference clock signal to be a reference of an operation of each circuit in the integrated circuit 3 and various internal clock signals.

The integrated circuit 3 has an input terminal 3a for the excitation signal AS, an input terminal 3b for receiving the output signals from the resolver 5 and an output terminal 3c for the angle signal θ2.

The integrated circuit 3 is mounted on the printed circuit board 8 different from the printed circuit board 7 on which the integrated circuit 2 and the excitation I/F 6 are mounted.

The angle signals θ1 and θ2 are used to perform rotation control and the like of the first and second rotating apparatuses, respectively, in a rotating apparatus control portion such as a motor control device not shown.

As described above, in the system having two rotating apparatuses such as a motor and a generator, the resolver 4 is attached to the first rotating apparatus, and the resolver 5 is attached to the second rotating apparatus. The integrated circuit 2 supplies the excitation signal AS to the resolvers 4 and 5 via the excitation I/F 6 and also supplies the excitation signal AS to the integrated circuit 3.

The angle detection apparatus 1 is provided with one excitation I/F 6, and an excitation I/F is not mounted on the printed circuit board 8 on which the integrated circuit 3 is mounted. Therefore, as for the printed circuit board 8 on which the integrated circuit 3 is mounted, a cost for the excitation I/F 6 for the printed circuit board 8 can be reduced, and a size of the printed circuit board 8 is also reduced.

As described above, the integrated circuit 2 outputs the angle signal θ1 based on the output signals of the resolver 4, and the integrated circuit 3 outputs the angle signal θ2 based on the output signals of the resolver 5.

For example, an excitation signal AS with sin τ generated by the excitation signal generation portion 11 is inputted to the resolver 4 via the excitation I/F 6. When the rotation angle of the first rotating apparatus is denoted by φ, two signals with sin τ cos φ and sin Σ sin φ are obtained as the output signals of the resolver 4. When an estimated angle of the rotation angle by the angle detection portion 13 is θ1, a following equation (1) is satisfied.

$$\sin \tau \sin(\theta 1 - \phi) = \sin \tau \sin \theta 1 \cos \phi - \sin \tau \cos \theta 1 \sin \phi) \quad (1)$$

Then, a value of θ1 (=φ) that satisfies θ1−φ=0 in the left side of the equation (1) can be determined as the angle signal. In the calculation process, the sin τ component is removed by synchronous detection.

The angle signal θ1 of the first rotating apparatus can be determined as shown above.

The angle signal θ2 of the second rotating apparatus can be similarly determined in the integrated circuit 3. The description so far has been made with the two circuit boards 7 and 8, and the two circuit boards 7 and 8 may be same circuit boards.

Figure 2:
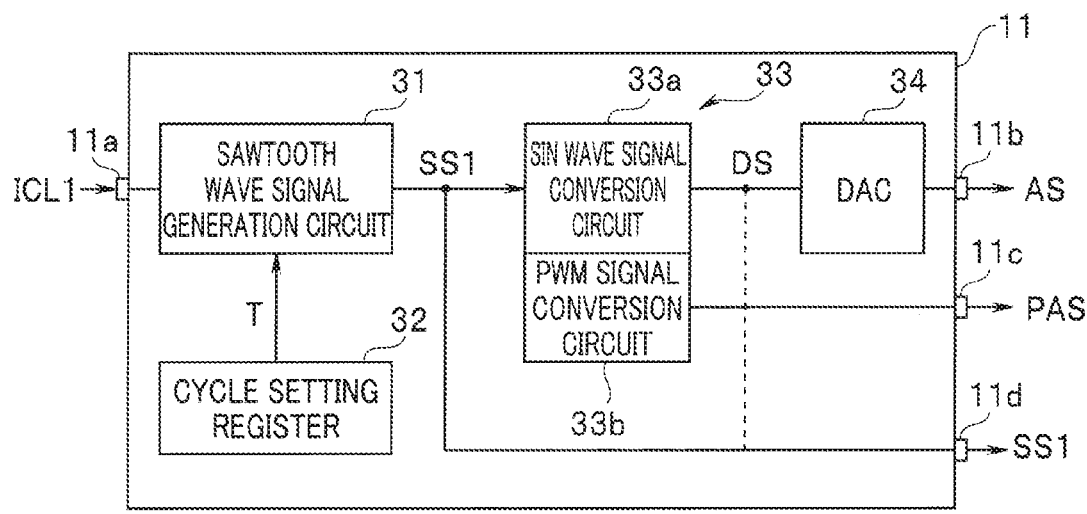
FIG. 2 is a block diagram showing an excitation signal generation portion of a first integrated circuit according to the first embodiment.

FIG. 2 is a block diagram showing the excitation signal generation portion 11 of the integrated circuit 2.

The excitation signal generation portion 11 includes a sawtooth wave signal generation circuit 31, a cycle setting register 32, a signal conversion circuit 33 and a digital/analog conversion circuit (hereinafter abbreviated as a DAC) 34. The excitation signal generation portion 11 has an input terminal 11*a* for an internal clock signal ICL1, an output terminal 11*b* for the excitation signal AS, an output terminal 11*c* for a PWM signal PAS and an output terminal 11*d* for a sawtooth wave signal SS1.

The sawtooth wave signal generation circuit 31 generates a sawtooth wave signal SS1 with a cycle T based on the internal clock signal ICL1 of the integrated circuit 2. The sawtooth wave signal SS1 is a detection sync signal. The internal clock signal ICL1 is generated based on an output of the crystal oscillator 14. The cycle T is set for the cycle setting register 32.

The sawtooth wave signal generation circuit 31 has an internal counter. For example, the sawtooth wave signal SS1 is expressed with 16 bits and can take a value between 0x0000 and 0xFFFF inclusive. The sawtooth wave signal generation circuit 31 generates the sawtooth wave signal SS1 by counting up the internal counter using an internal clock.

For each internal clock signal ICL1, a predetermined value a1 corresponding to the cycle T is added to the internal counter of the sawtooth wave signal generation circuit 31. When a counter value exceeds a maximum value, the internal counter is cleared and starts counting up from 0.

Therefore, the sawtooth wave signal generation circuit 31 outputs the sawtooth wave signal SS1 by outputting an accumulated value to which the predetermined value a1 is added, for each internal clock signal ICL1. The cycle T of the sawtooth wave signal SS1 and a cycle (hereinafter referred to as an excitation cycle) of the excitation signal AS correspond to each other.

For example, sixteenth power of two of the cycle of the internal clock (that is, "65536") does not correspond to the cycle T. An increment of the counter value per clock of the internal clock is a value with a decimal portion, which is larger than +1. In this case, in the sawtooth wave signal generation circuit 31, "6.5536" is set as the predetermined value a1 corresponding to the cycle T. That is, the increment per clock of the internal clock is "6.5536".

Note that, since the number of digits which can be set in the sawtooth wave signal generation circuit 31 is finite, and decimal fractions appear when addition of the above predetermined value a1 is continued during a period of the cycle T, and, therefore, measures for truncating the fractions are appropriately taken.

The sawtooth wave signal SS1 is outputted to the signal conversion circuit 33.

The signal conversion circuit 33 includes an SIN wave signal conversion circuit 33*a* and a PWM signal conversion circuit 33*b*.

The SIN wave signal conversion circuit 33*a* internally has a conversion table and converts the sawtooth wave signal SS1 to an SIN wave code signal DS. The SIN wave code signal DS is inputted to the DAC 34, converted to an excitation signal AS, which is an analog signal with sin τ and outputted.

The PWM signal conversion circuit 33*b* internally has a conversion table and converts the sawtooth wave signal SS1 to a PWM signal PAS and outputs the PWM signal PAS.

The excitation signal AS or the PWM signal PAS is outputted to the excitation I/F 6. Furthermore, the sawtooth wave signal SS1 is outputted to the angle detection portion 13.

The sawtooth wave signal SS1 is inputted to the detection circuit 15 of the angle detection portion 13.

As described above, the integrated circuit 2 generates and outputs the excitation signal AS to the resolver 4 and generates the sawtooth wave signal SS1 which is a detection sync signal. The integrated circuit 2 performs synchronous detection of the excitation signal AS for an output signal of the resolver 4 based on the sawtooth wave signal SS1 and outputs the angle signal θ1 of the first rotating apparatus.

Figure 3:
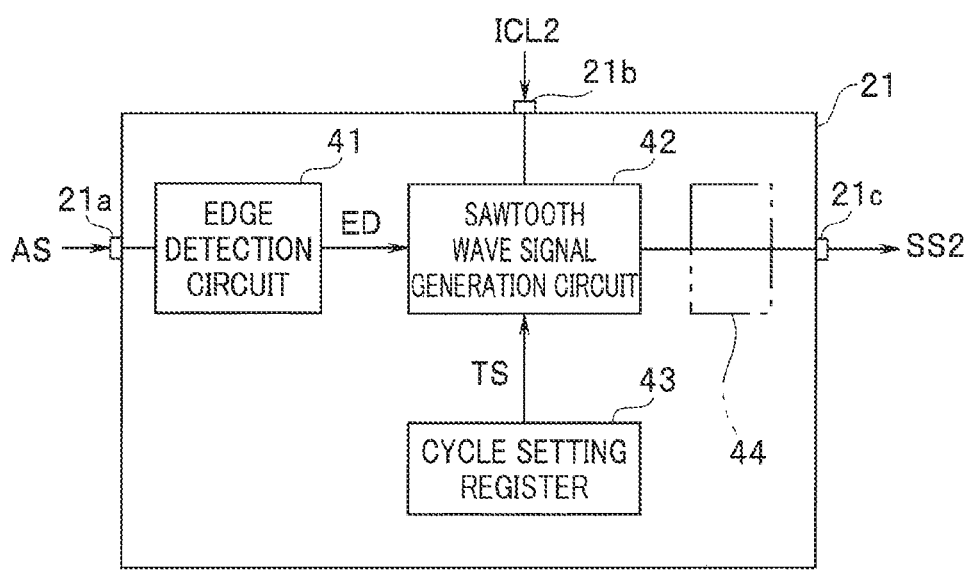
FIG. 3 is a block diagram showing a detection sync signal generation circuit of a second integrated circuit according to the first embodiment.

FIG. 3 is a block diagram showing the detection sync signal generation circuit 21 of the integrated circuit 3.

The detection sync signal generation circuit 21 includes an edge detection circuit 41, a sawtooth wave signal generation circuit 42 and a cycle setting register 43. The detection sync signal generation circuit 21 has an input terminal 21*a* for the excitation signal AS, an input terminal 21*b* for an internal clock signal ICL2 and an output terminal 21*c* for a sawtooth wave signal SS2.

The edge detection circuit 41 detects an edge of the excitation signal AS. The edge detection circuit 41 internally has a Schmitt trigger circuit configured to convert the excitation signal AS to a pulse signal, detects a rise of a generated excitation pulse signal and outputs an edge detection signal ED. The edge detection signal ED is a pulse signal. The excitation pulse signal is a signal converted to a pulse signal train having a same repetition cycle as a cycle of the excitation signal AS. Note that, the Schmitt trigger circuit may be provided outside the edge detection circuit 41.

The sawtooth wave signal generation circuit 42 generates and outputs the sawtooth wave signal SS2, with the edge detection signal ED as a trigger signal. The sawtooth wave signal generation circuit 42 has an internal counter. The sawtooth wave signal SS2 is a detection sync signal with a cycle TS longer than the cycle T of the sawtooth wave signal SS1. The cycle TS is set for the cycle setting register 43.

The sawtooth wave signal generation circuit 42 generates the sawtooth wave signal SS2 by counting up the internal counter of the sawtooth wave signal generation circuit 42 using an internal clock. When a counter value of the internal counter of the sawtooth wave signal generation circuit 42 exceeds a maximum value, or when the edge detection signal ED is received, the counter value is cleared, and the internal counter starts counting up from 0.

As described above, the integrated circuit 3 has the edge detection circuit 41 configured to detect an edge of a pulse signal obtained by converting the excitation signal AS and output the edge detection signal ED. The sawtooth wave signal SS2 is generated based on the edge detection signal ED and has one cycle longer than one cycle of the excitation signal AS. The sawtooth wave signal SS2 is generated by counting up the counter based on a reference clock in the integrated circuit 3, and the counter is initialized in response to the edge detection signal ED.

Therefore, the sawtooth wave signal generation circuit 42 outputs the sawtooth wave signal SS2 by outputting an accumulated value to which a predetermined value a2 is added for each internal clock signal ICL2 of the integrated circuit 3. The internal clock signal ICL2 is generated based on an output of the crystal oscillator 24. The predetermined value a2 may be same as the predetermined value a1 of the sawtooth wave signal generation circuit 31 or may be different.

That is, the integrated circuit 2 has the cycle setting register 32 configured to store a cycle value of the excitation signal AS, which is a sine wave signal, and the integrated circuit 3 has the cycle setting register 43 configured to store a cycle value of the detection sync signal SS2, which is a sawtooth wave signal or a sine wave signal. A cycle value larger than a cycle value set for the cycle setting register 32 is set for the cycle setting register 43.

When a value Rate is set for the cycle setting register 32 as the cycle T, a value "Rate+α" is set for the cycle setting register 43 as the cycle TS. Here, α is a value of an error between natural frequencies of the crystal oscillators 14 and 24 or a positive value obtained by adding a margin to the value of the error.

The sawtooth wave signal SS2 is inputted to the detection circuit 25 of the angle detection portion 23.

As described above, the integrated circuit 3 receives the excitation signal AS and generates the sawtooth wave signal SS2 which is a detection sync signal. The integrated circuit 3 performs synchronous detection of the excitation signal AS for an output signal from the resolver 5 based on the sawtooth wave signal SS2 and outputs the angle signal θ2 of the second rotating apparatus.

Note that a sin wave signal may be used in synchronous detection by the detection circuits 15 and 25. In this case, as indicated by a dotted line in FIG. 2, the excitation signal generation portion 11 outputs the SIN wave code signal DS to the angle detection portion 13, and the detection sync signal generation circuit 21 converts the sawtooth wave signal SS2 to a sin wave signal by a sin wave signal conversion circuit 44 indicated by a two-dot chain line in FIG. 3 and outputs the sin wave signal.

Figure 4:
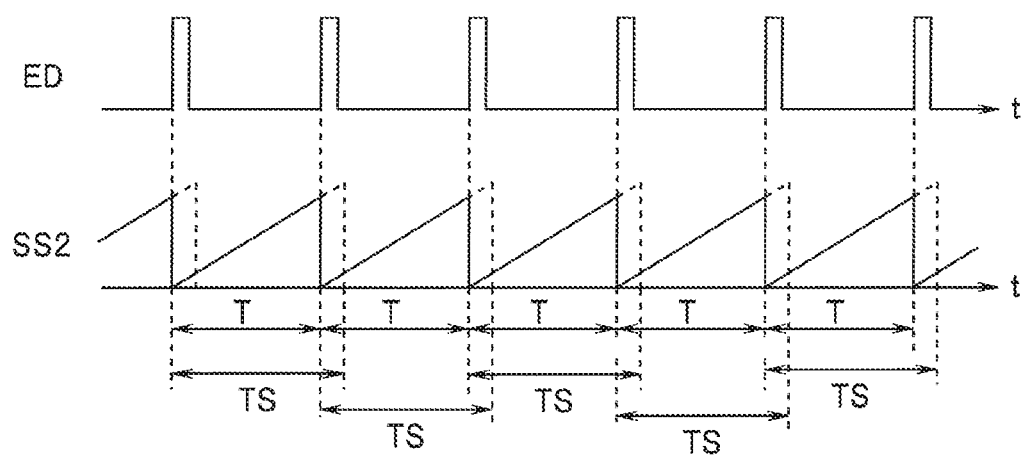
FIG. 4 is a diagram for illustrating a waveform of a sawtooth wave signal generated by the detection sync signal generation circuit according to the first embodiment.

FIG. 4 is a diagram for illustrating a waveform of the sawtooth wave signal SS2.

After being cleared at a timing of a rise of the edge detection signal ED, the internal counter of the sawtooth wave signal generation circuit 42 is counted up from 0.

Since the cycle TS longer than the cycle T is set for the cycle setting register 43, the internal counter of the sawtooth wave signal generation circuit 42 is initialized by the edge detection signal ED before the maximum value is reached as shown in FIG. 4.

If the edge detection signal ED is not received, the internal counter of the sawtooth wave signal generation circuit 42 is cleared after performing counting up to reach the maximum value as shown by a dotted line in FIG. 4. In this case, a cycle of the sawtooth wave signal SS2 is the cycle TS.

However, the internal counter of the sawtooth wave signal generation circuit 42 is cleared with the edge detection signal ED as a trigger signal before the counter value reaches the maximum value.

As a result, the cycle of the sawtooth wave signal SS2 becomes shorter than the set cycle TS and becomes the cycle T which is same as the excitation cycle of the excitation signal AS.

In other words, the detection sync signal generation circuit 21 constitutes a timing signal generation circuit configured to generate the sawtooth wave signal SS2 for performing synchronous detection synchronized with the excitation signal AS for an output signal from the resolver 5, based on a timing signal generated according to the cycle of the excitation signal AS from the integrated circuit 2. The angle detection portion 23 performs synchronous detection based on the sawtooth wave signal SS2 and outputs the angle signal θ2 of the second rotating apparatus.

As described above, in the present embodiment, an excitation signal outputted by the excitation signal generation portion 11 of the first integrated circuit 2 is inputted to the second integrated circuit 3. In the second integrated circuit 3, the internal counter configured to output a detection sync signal such as a sawtooth wave signal is initialized in synchronization with the excitation signal from the first integrated circuit 2.

Therefore, according to the present embodiment, a common excitation signal AS is used, and, even if there is a difference between the cycle of the internal clock of the integrated circuit 2 which supplies the excitation signal AS and the cycle of the internal clock of the integrated circuit 3 which is supplied with the excitation signal AS, synchronous detection is possible in the integrated circuit 3, and it is possible to calculate the rotation angle of the second rotating apparatus from an output signal of the resolver 5.

Second Embodiment

In the first embodiment, by setting the cycle of the sawtooth wave signal SS2 in the second integrated circuit longer than the cycle of the sawtooth wave signal SS1 in the first integrated circuit to adjust the cycle of the sawtooth wave signal in the second integrated circuit to a trigger signal occurrence timing based on the excitation signal AS, synchronous detection in the second integrated circuit is enabled. In comparison, in the a second embodiment, by correcting the cycle of the sawtooth wave signal SS2 in the second integrated circuit based on a value of the sawtooth wave signal SS2 at time of occurrence of a trigger signal based on the excitation signal AS, synchronous detection in the second integrated circuit is enabled.

Since a configuration of an angle detection apparatus of the second embodiment is almost same as the configuration of the angle detection apparatus 1 in FIG. 1, same components will be given same reference numerals, and description of the components will be omitted. Description will be made on different components. In the angel detection apparatus of the second embodiment is different in the configuration of the detection sync signal generation circuit 21 of the integrated circuit 3.

Figure 5:
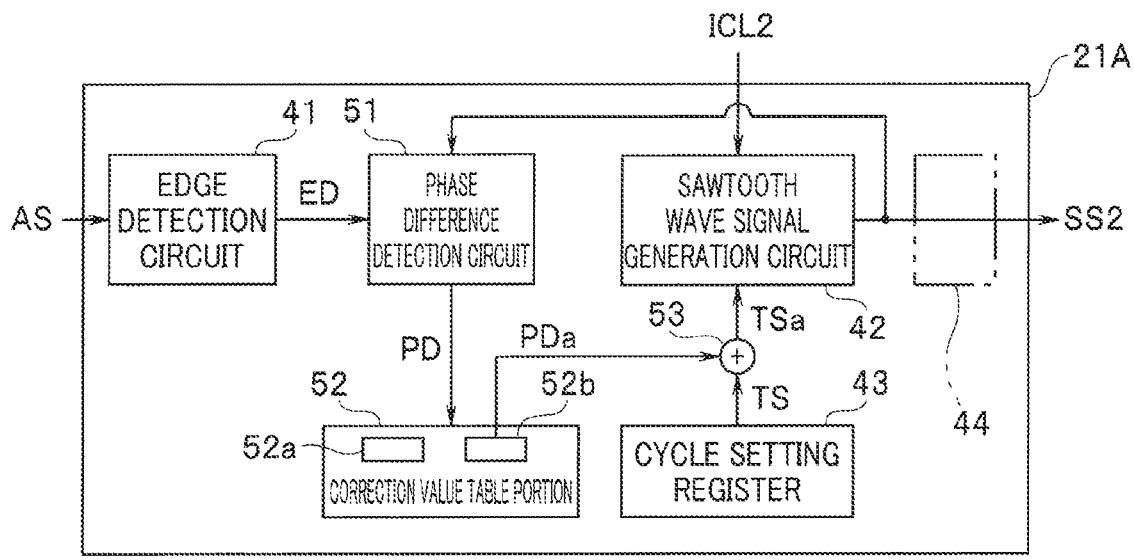
FIG. 5 is a block diagram showing a detection sync signal generation circuit of an integrated circuit according to a second embodiment.

FIG. 5 is a block diagram showing a detection sync signal generation circuit 21A of the integrated circuit 3 according to the present embodiment.

The detection sync signal generation circuit 21A constitutes a timing signal generation circuit configured to generate the sawtooth wave signal SS2 for performing synchronous detection synchronized with the excitation signal AS. The detection sync signal generation circuit 21A includes the edge detection circuit 41, the sawtooth wave signal generation circuit 42 and the cycle setting register 43, a phase difference detection circuit 51, a correction value table portion 52 and an adder 53.

The phase difference detection circuit 51 receives the edge detection signal ED of the edge detection circuit 41 and the sawtooth wave signal SS2 of the sawtooth wave signal generation circuit 42 and outputs a phase difference signal PD to the correction value table portion 52.

At the timing of a rise of the edge detection signal ED, the phase difference detection circuit 51 samples a value of the sawtooth wave signal SS2 and outputs the value to the correction value table portion 52 as the phase difference signal PD.

The correction value table portion 52 internally has a conversion table 52a and a correction value resistor 52b. The conversion table 52a stores correction values PDa corresponding to differences between phase difference signals PD and a predetermined threshold, for example, differences from a threshold 0. The correction values PDa are values for causing the cycle TS of the sawtooth wave signal SS2 to be longer or shorter according to a difference from the threshold. For the correction value resistor 52b, a correction value PDa obtained by converting the phase difference signal PD by referring to the conversion table 52a is set.

The adder 53 outputs a modified cycle TSa obtained by adding the correction value PDa to the value of the cycle TS, to the sawtooth wave signal generation circuit 42.

The correction value table portion 52 and the adder 53 constitute a cycle correction portion.

The sawtooth wave signal generation circuit 42 has an internal counter. Similarly to the sawtooth wave signal SS1, the sawtooth wave signal SS2 is expressed with 16 bits and can take a value between 0x0000 and 0xFFFF inclusive. The sawtooth wave signal generation circuit 42 generates the sawtooth wave signal SS2 by counting up the internal counter of the sawtooth wave signal generation circuit 42 using the internal clock ICL2. When a counter value exceeds a maximum value, the internal counter is cleared and starts counting up from 0.

Therefore, the sawtooth wave signal generation circuit 42 outputs the sawtooth wave signal SS2 with a cycle of an addition value TSa by outputting an accumulated value to which a predetermined value a3 corresponding to the addition value TSa is added, for each internal clock signal ICL2.

Figure 6:
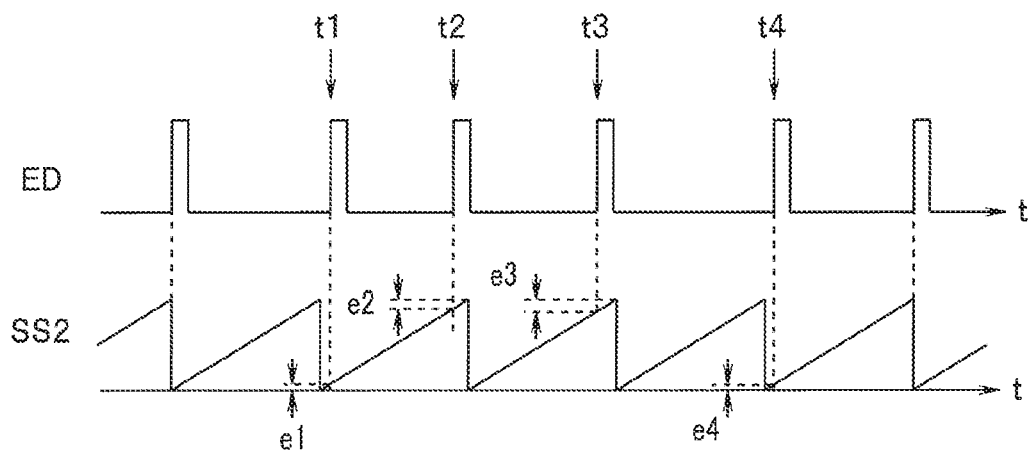
FIG. 6 is a diagram for illustrating a waveform of a sawtooth wave signal generated by the detection sync signal generation circuit according to the second embodiment.

FIG. 6 is a diagram for illustrating the waveform of the sawtooth wave signal SS2 generated by the sawtooth wave signal generation circuit 42.

In FIG. 6, at timings of time t1 and time t4, a sampled value of the sawtooth wave signal SS2 is a value slightly larger than the value 0 after initialization. At the time t1, a difference from the threshold 0 is e1. At the time t4, the difference from the threshold 0 is e4. The phase difference signal PD is a value of the sawtooth wave signal SS2 sampled at the timing of the rise of the edge detection signal ED.

Further, at timings of time t2 and time t3, a sampled value of the sawtooth wave signal SS2 is a value for which the difference from the threshold 0 is large and a difference from a maximum value is small. At the time t2, the difference between the threshold 0 and the sawtooth wave signal SS2 is large, and a difference e2 from the maximum value is small. At the time t3, the difference between the threshold 0 and the sawtooth wave signal SS2 is large, and a difference e3 from the maximum value is small.

In a case where the difference from the threshold 0 is small (in the cases of the differences e1 and e4 here), it means that the cycle of the sawtooth wave signal SS2 is shorter than the excitation cycle. In a case where the difference from the threshold 0 is large (in the cases of the differences e2 and e3 here), it means that the cycle of the sawtooth wave signal SS2 is longer than the excitation cycle.

The sawtooth wave signal SS2 can take a value between 0x0000 and 0xFFFF inclusive. Therefore, as for the difference from the threshold 0, if it is assumed that a sampled sawtooth wave signal is a complement of 2, the cycle of the sawtooth wave signal SS2 and the excitation cycle become equal by lengthening the cycle of the sawtooth wave signal SS2 when an upper 1-bit sign bit is 0. Further, when the upper 1-bit sign bit is 1, the cycle of the sawtooth wave signal SS2 and the excitation cycle become equal by shortening the cycle of the sawtooth wave signal SS2.

The correction value table portion 52 refers to the conversion table 52a and outputs a correction value PDa corresponding to a difference between a value of the sawtooth wave signal SS2 sampled at the timing of the edge detection signal ED and the threshold to the adder 53. Further, if the sampled sawtooth wave signal is regarded as a complement of 2, the correction value PDa can be calculated by shifting the value to right in a state of the sign of the value being kept.

Then, an addition value (TS+PDa) is supplied to the sawtooth wave signal generation circuit 42 as a modified cycle TSa which has been corrected.

Therefore, the sawtooth wave signal generation circuit 42 outputs a sawtooth wave signal SS2 with the cycle TSa by outputting an accumulated value to which a value corresponding to the cycle TSa is added, for each internal clock signal ICL2. As a result, the cycle of the sawtooth wave signal SS2 and the excitation cycle of the excitation signal AS correspond to each other.

The phase difference detection circuit 51 compares the excitation cycle of the edge detection signal ED with the cycle of the sawtooth wave signal SS2 for each excitation cycle. In the correction value table portion 52, adjustments are made so that the excitation cycle and the cycle of the sawtooth wave signal SS2 of the integrated circuit 3 correspond to each other, by setting the correction value PDa for the correction value resistor 52b for each excitation cycle.

That is, the integrated circuit 3 has the edge detection circuit 41 configured to detect an edge of a pulse signal obtained by converting the received excitation signal AS and output the edge detection signal ED, the phase difference detection circuit 51 configured to detect a phase difference between the sawtooth wave signal SS2 and the edge detection signal ED, and a cycle correction portion configured to correct the cycle of the sawtooth wave signal SS2 according to the phase difference. The correction value table portion 52 constituting the cycle correction portion has the conversion table 52a which is a correction value table configured to store correction values corresponding to phase differences. The integrated circuit 3 outputs the sawtooth wave signal SS2 the cycle of which has been corrected according to the phase difference detected by the phase difference detection circuit 51 based on the conversion table 52a.

As described above, in the detection sync signal generation circuit 21A of the second integrated circuit 3, a phase difference between the excitation signal AS and the sawtooth wave signal SS2 is determined. By obtaining a correction value PDa corresponding to the phase difference in the correction value table portion 52 and adding the correction value PDa to the cycle TS, the detection sync signal generation circuit 21A causes the cycle of the sawtooth wave signal SS2 to correspond to the excitation cycle of the excitation signal AS.

Therefore, even if there is a difference between the cycle of the internal clock ICL2 used for synchronous detection of the integrated circuit 3 and the cycle of the internal clock ICL1 of the integrated circuit 2 configured to supply the excitation signal AS, synchronous detection is possible in the integrated circuit 3, and it is possible to calculate the rotation angle of the second rotating apparatus from an output signal of the resolver 5.

Note that though a value obtained by the adder 53 adding the correction value PDa to the cycle TS is supplied to the sawtooth wave signal generation circuit 42 in the embodiment described above, it is also conceivable that, without using the adder 53, the CPU included in the integrated circuit 3 performs addition operation and writes an addition result to the cycle setting register 43.

Figure 7:
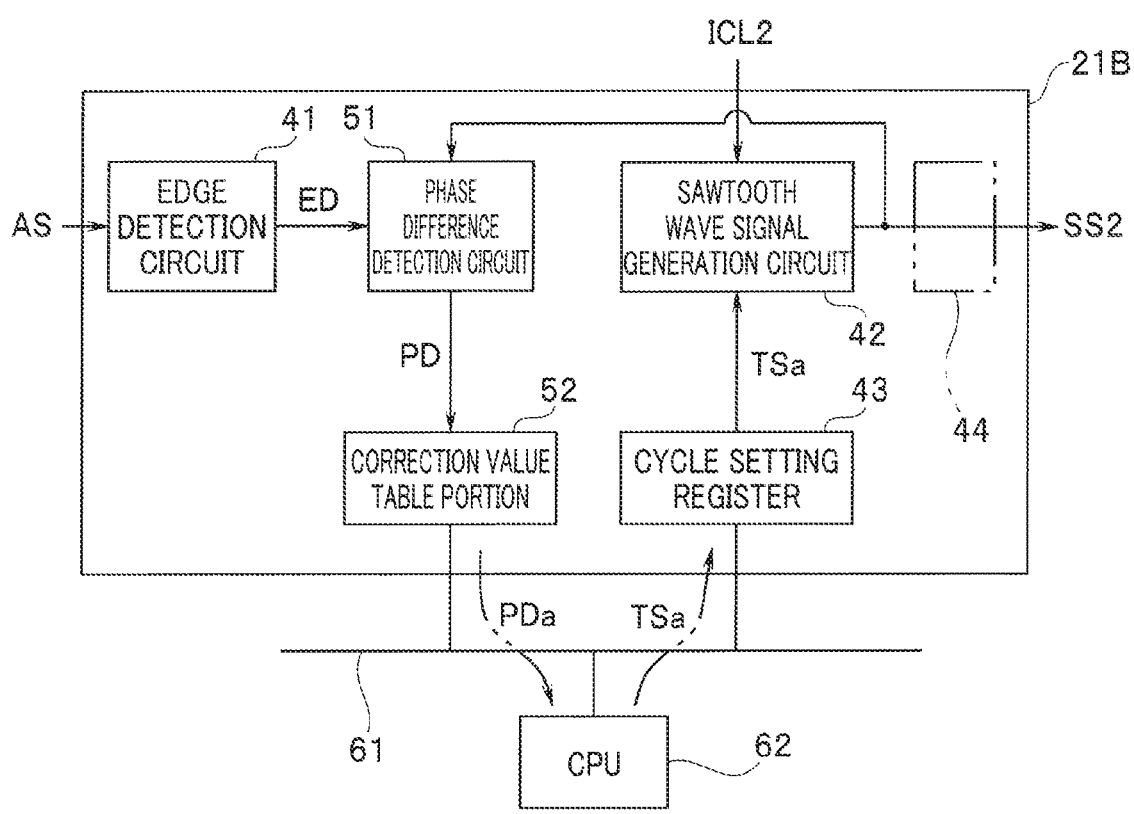
FIG. 7 is a block diagram showing a detection sync signal generation circuit according to a modification of the second embodiment.

FIG. 7 is a block diagram showing a detection sync signal generation circuit 21B according to a modification of the second embodiment.

The correction value table portion 52 and the cycle setting register 43 are connected to a CPU 62 via a bus 61 so as to be able to exchange data with the CPU 62.

The correction value table portion 52 outputs a signal of the correction value PDa to the CPU 62.

The value of the cycle setting register 43 can be set by the CPU 62.

The CPU 62 adds the received correction value signal PDa to the cycle TS and stores a modified cycle TSa into the cycle setting register 43.

According to such a configuration also, effects similar to those of the second embodiment can be obtained.

Note that the CPU 62 may be a dedicated processor such as a DSP.

Therefore, according to the second embodiment also, even if there is a difference between the cycle of the internal clock used for synchronous detection and the cycle of the internal clock of the integrated circuit 2 configured to supply the excitation signal AS to the resolver 5, synchronous detection is possible in the integrated circuit 3, and it is possible to calculate the rotation angle of the second rotating apparatus from an output signal of the resolver 5.

As described above, according to the first and second embodiments, even if there is a difference between a cycle of an internal clock used for synchronous detection and a cycle of an excitation signal to a resolver, synchronous detection is possible, and it is possible to calculate rotation angles of a plurality of rotating apparatuses.

Especially, though, in the case of the angle detection apparatuses of the first and second embodiments, there are two rotating apparatuses, the angle detection apparatus is applicable to a case of detecting rotation angles of three or more rotating apparatuses. For example, in a system having a plurality of rotating apparatuses such as generators and motors, an excitation I/F for resolvers for detection of angles of the respective rotating apparatuses is shared as one circuit to reduce the number of parts. As a result, a more inexpensive angle detection apparatus can be realized.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. An angle detection apparatus comprising:
a first integrated circuit configured to generate and output an excitation signal to a first resolver for detecting a rotation angle of a first rotating apparatus, perform a synchronous detection synchronized with the excitation signal for an output signal from the first resolver based on a first sync signal, and output a first angle signal of the first rotating apparatus; and
a second integrated circuit configured to receive the excitation signal, perform the synchronous detection synchronized with the excitation signal for an output signal from a second resolver for detecting a rotation angle of a second rotating apparatus based on second sync signal, and output a second angle signal of the second rotating apparatus, the second sync signal being generated based on the excitation signal.

2. The angle detection apparatus according to claim 1, wherein
the first integrated circuit comprises a first cycle setting resistor configured to store a first cycle value of the excitation signal which is a sine wave signal; and
the second integrated circuit comprises a second cycle setting resistor configured to store a second cycle value of the second sync signal which is a sawtooth wave signal or a sine wave signal.

3. The angle detection apparatus according to claim 1, wherein the second cycle value is larger than the first cycle value.

4. The angle detection apparatus according to claim 1, wherein
the second integrated circuit comprises an edge detection circuit configured to detect an edge of a pulse signal when the received excitation signal is converted to the pulse signal and output an edge detection signal; and
the second sync signal is generated based on the edge detection signal.

5. The angle detection apparatus according to claim 4, wherein
the second sync signal is a sawtooth wave signal having one cycle longer than one cycle of the excitation signal;
the sawtooth wave signal is generated by counting up a counter based on a reference clock of the second integrated circuit; and
the counter is initialized in response to the edge detection signal.

6. The angle detection apparatus according to claim 1, wherein
the second integrated circuit comprises:
an edge detection circuit configured to detect an edge of a pulse signal when the received excitation signal is converted to the pulse signal and output an edge detection signal;
a phase difference detection circuit configured to detect a phase difference between the second sync signal and the edge detection signal; and
a cycle correction portion configured to correct a cycle of the second sync signal according to the phase difference.

7. The angle detection apparatus according to claim 6, wherein the cycle correction portion includes a correction value table configured to store correction values corresponding to phase differences and correct the cycle of the second sync signal according to the phase difference detected by the phase difference detection circuit, based on the correction value table.

8. The angle detection apparatus according to claim 1, comprising:
a first printed circuit board mounted with the first integrated circuit and an excitation interface circuit configured to supply the excitation signal to the first resolver; and
a second printed circuit board mounted with the second integrated circuit.

* * * * *